(12) United States Patent
Garfio et al.

(10) Patent No.: US 8,149,218 B2
(45) Date of Patent: Apr. 3, 2012

(54) CONTROLLING DEVICE WITH SELECTIVELY ILLUMINATED USER INTERFACES

(75) Inventors: Alejandro Garfio, Pico Rivera, CA (US); Cesar Alvarado, Orange, CA (US)

(73) Assignee: Universal Electronics, Inc., Cypress, CA (US)

( * ) Notice: Subject to any disclaimer, the term of this patent is extended or adjusted under 35 U.S.C. 154(b) by 1824 days.

(21) Appl. No.: 11/018,008

(22) Filed: Dec. 21, 2004

(65) Prior Publication Data

US 2006/0132458 A1    Jun. 22, 2006

(51) Int. Cl.
    G09G 5/00    (2006.01)
(52) U.S. Cl. ......... 345/173; 345/168; 345/170; 345/172
(58) Field of Classification Search .......... 345/173, 345/168, 170, 172
    See application file for complete search history.

(56) References Cited

U.S. PATENT DOCUMENTS

| | | |
|---|---|---|
| 4,623,887 A | 11/1986 | Welles, II |
| 4,959,810 A | 9/1990 | Darbee et al. |
| 5,255,313 A | 10/1993 | Darbee |
| 5,481,256 A | 1/1996 | Darbee et al. |
| 5,552,917 A | 9/1996 | Darbee et al. |
| 5,614,906 A | 3/1997 | Hayes et al. |
| 5,729,222 A | 3/1998 | Iggulden et al. |
| 5,777,588 A | 7/1998 | Woodgate et al. |
| 5,818,400 A | 10/1998 | Nagan |
| 5,959,751 A | 9/1999 | Darbee et al. |
| 6,014,092 A | 1/2000 | Darbee et al. |
| 6,174,065 B1 * | 1/2001 | Schurch ................. 362/605 |
| 6,225,938 B1 | 5/2001 | Hayes et al. |
| 6,342,831 B1 | 1/2002 | Azima |
| 6,515,734 B1 | 2/2003 | Yamada et al. |
| 2001/0026625 A1 | 10/2001 | Azima et al. |
| 2002/0152462 A1 | 10/2002 | Hoch et al. |
| 2003/0025840 A1 | 2/2003 | Arling |
| 2003/0103088 A1 | 6/2003 | Dresti et al. |
| 2004/0012572 A1 | 1/2004 | Sowden et al. |
| 2004/0034874 A1 | 2/2004 | Hord et al. |
| 2005/0018413 A1 | 1/2005 | Hoffman |
| 2007/0052681 A1 * | 3/2007 | Bathiche ................. 345/172 |

FOREIGN PATENT DOCUMENTS

JP    2002-131093 A    *    5/2002

* cited by examiner

*Primary Examiner* — Richard Hjerpe
*Assistant Examiner* — Leonid Shapiro
(74) *Attorney, Agent, or Firm* — Greenberg Traurig LLP

(57) ABSTRACT

A controlling device using a source of energy, such as light energy, to provide the controlling device with a user interface having multiple, different visual appearances.

9 Claims, 11 Drawing Sheets

Exploded View

Assembled View

CONTROLLING DEVICE WITH SELECTIVELY ILLUMINATED USER INTERFACES

BACKGROUND

The following relates generally to controlling devices and, more particularly, to a controlling device having multiple user interfaces.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

For selecting which of multiple appliances a universal remote control is to command, a universal remote control may allow a user to place, i.e., configure, the universal remote control into an operational mode whereby the function keys will be used to transmit commands to a "primary" target appliance that has been associated with that operational mode. For example, a "TV" operational mode may be selected to place the universal remote control into an operational mode whereby function keys are used to transmit commands primarily to a designated television, a "VCR" mode may be selected to place the universal remote control into an operational mode whereby function keys are used to transmit commands primarily to a designated VCR, etc. A universal remote control may also be provided with an ability to be configured in a "home theater" operational mode (i.e., one established to facilitate a particular activity), a "user" operational mode (i.e., one established for a particular user), "room" operational mode (i.e., one established for a particular room), or the like (collectively referred to hereinafter as a "home theater" operational mode). In a "home theater" operation mode, the universal remote control will generally be adapted to command multiple, target appliances. For example, a "home theater" mode may be established whereby volume function keys are used to transmit volume control commands to an amplifier, transport function keys are used to transmit transport control commands to a VCR, channel function keys are used to transmit channel control commands to a cable box, picture control function keys are used to transmit picture control commands to a television, etc. Further, a universal remote control may also be provided with an ability to have certain key groups (e.g., volume or channel controls) permanently assigned to command specific devices regardless of the operational mode currently selected—a so called "locked" state. By way of example, for convenience of a cable subscriber, channel changing keys may be set to always command operation of the cable STB, even if TV device mode is currently selected.

Accordingly, the ability to indicate current key assignments to a user, as well as the ability to alter the appearance and/or layout of the keypad area is advantageous in a universal remote control. In the case of universal remote controls having a display, the various function keys associated with the various operational modes are typically presented to a user in multiple, different user interfaces each comprising one or more displayed soft keys. For example, commonly assigned U.S. Published Patent Application No. 2003/0103088 (Ser. No. 10/288,727) discloses a universal remote control application for use in connection with a hand-held device having a display, e.g., a personal digital assistant ("PDA"), wherein the display is utilized to present the user with multiple, different user interfaces with different functional key layouts and iconic representations, each appropriate to the particular type of device (TV, VCR, CD, etc.) currently being controlled. In other cases, such as for example the universal remote control device described in commonly assigned U.S. Published Patent Application No. 2003/0025840 (Ser. No. 09/922,562) a display capability may be utilized to signal to a user which device type a set of common keys is currently assigned to in a home theater or locked state (e.g., volume keys always assigned to amplifier device, channel up/down always assigned to cable STB, etc.). However, while the use of a display advantageously allows a universal remote control to present a user with multiple, different user interfaces, what is needed is a more cost effective means for providing a universal remote control with multiple, different user interfaces.

SUMMARY

In accordance with this and other needs, the following generally discloses a controlling device having a face panel on which is carried both a first user interface activatable to cause transmission of at least one command to at least one appliance and a second user interface activatable to cause transmission of at least one command to at least one appliance. A first source of energy is used to cause the first user interface to be displayed on the face panel more prominently relative to the second user interface and a second source of energy is used to cause the second user interface to be displayed on the face panel more prominently relative to the first user interface. In this manner, multiple user interfaces may be provided to the controlling device while being able to maintain the overall size and cost of the controlling device to acceptable levels. In another embodiment, an element of a user interface on a face panel of a controlling device is arranged to reflect light energy from a source of light energy such that the element of the user interface will be provided with a discernable visual appearance as a result of the source of light energy being activated. In yet another embodiment, diverse user interface elements are positioned within separate layers of translucent material comprising a face panel of a controlling device, each layer provisioned with one or more separate sources of light energy such that the overall user interface may take on different visual appearances as different sources of light energy associated with different layers are enabled.

A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary controlling devices described hereinafter reference may be had to the following drawings in which.

DETAILED DESCRIPTION

For allowing a single controlling device 100 to present a user with multiple user interfaces, the following discloses a controlling device having a face panel on which is carried both a first user interface activatable to cause transmission of at least one command to at least one appliance and a second user interface activatable to cause transmission of at least one command to at least one appliance. A first source of energy is used to cause the first user interface to be displayed on the face panel more prominently relative to the second user interface and a second source of energy is used to cause the second user interface to be displayed on the face panel more prominently relative to the first user interface. In this manner, multiple user interfaces may be provided to the controlling device while being able to maintain the overall size of the controlling device to an acceptable size. Furthermore, since distinct colors may be provided to the user interfaces, the user may, in some instances, be able to quickly discern the current configuration of the controlling device 100 from the color(s) visible to the user.

Figure 1:
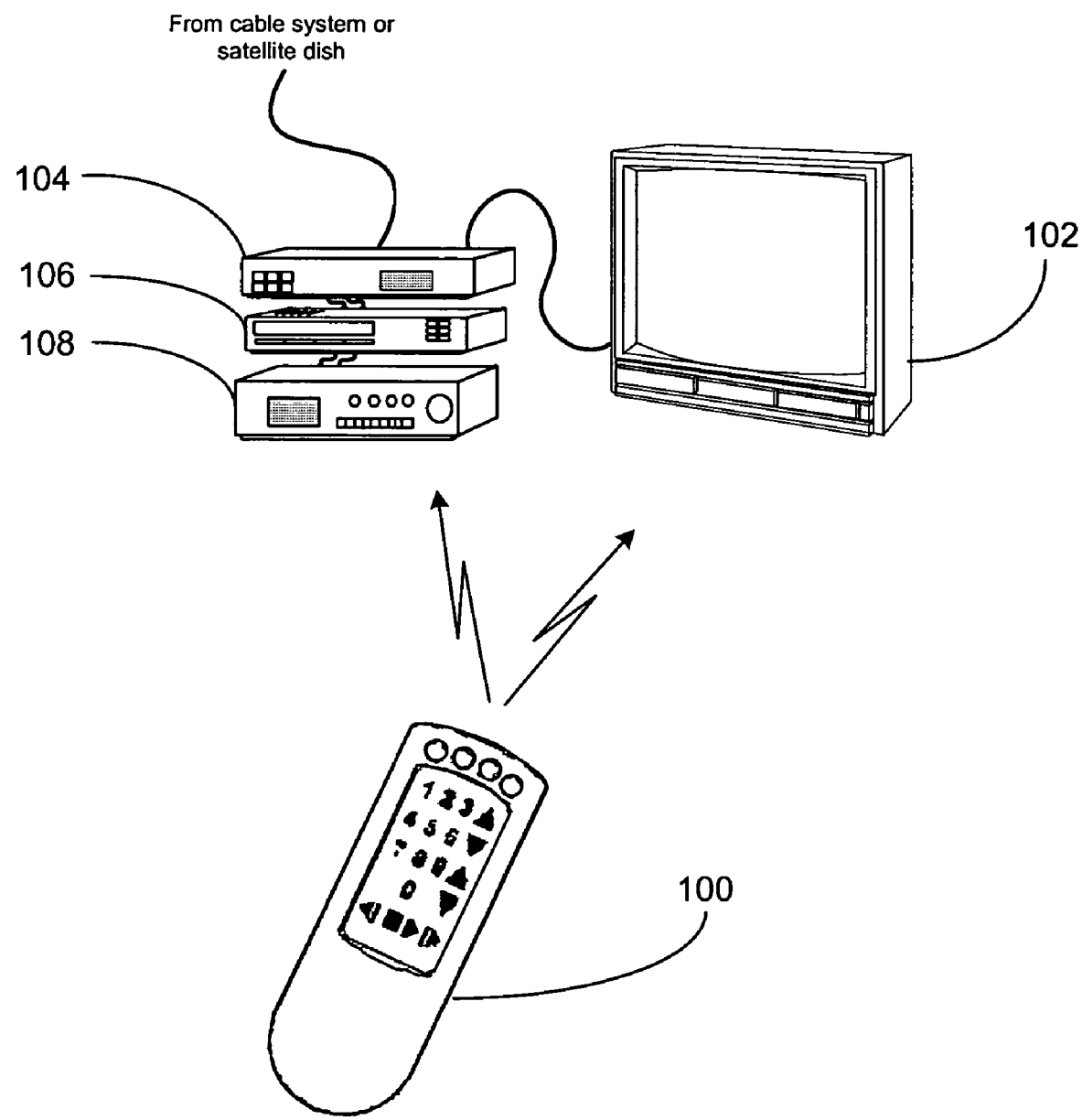
FIG. 1 illustrates an exemplary system in which the exemplary controlling devices may be utilized.

By way of example, FIG. 1 shows an exemplary system, including controllable appliances, such as a set top box ("STB") 104, a VCR 106, an audio amplifier/receiver 108 and a television 102, as well as a controlling device 100. The controlling device 100 is capable of transmitting commands to the appliances, using any convenient IR, RF, Point-to-Point, or networked protocol, to cause the appliances to perform operational functions. While illustrated in the context of a STB 104 with VCR 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc., and as such the instant exemplary disclosures are not intended to be limiting as to type or quantity of controllable appliances or equipment.

Figure 2:
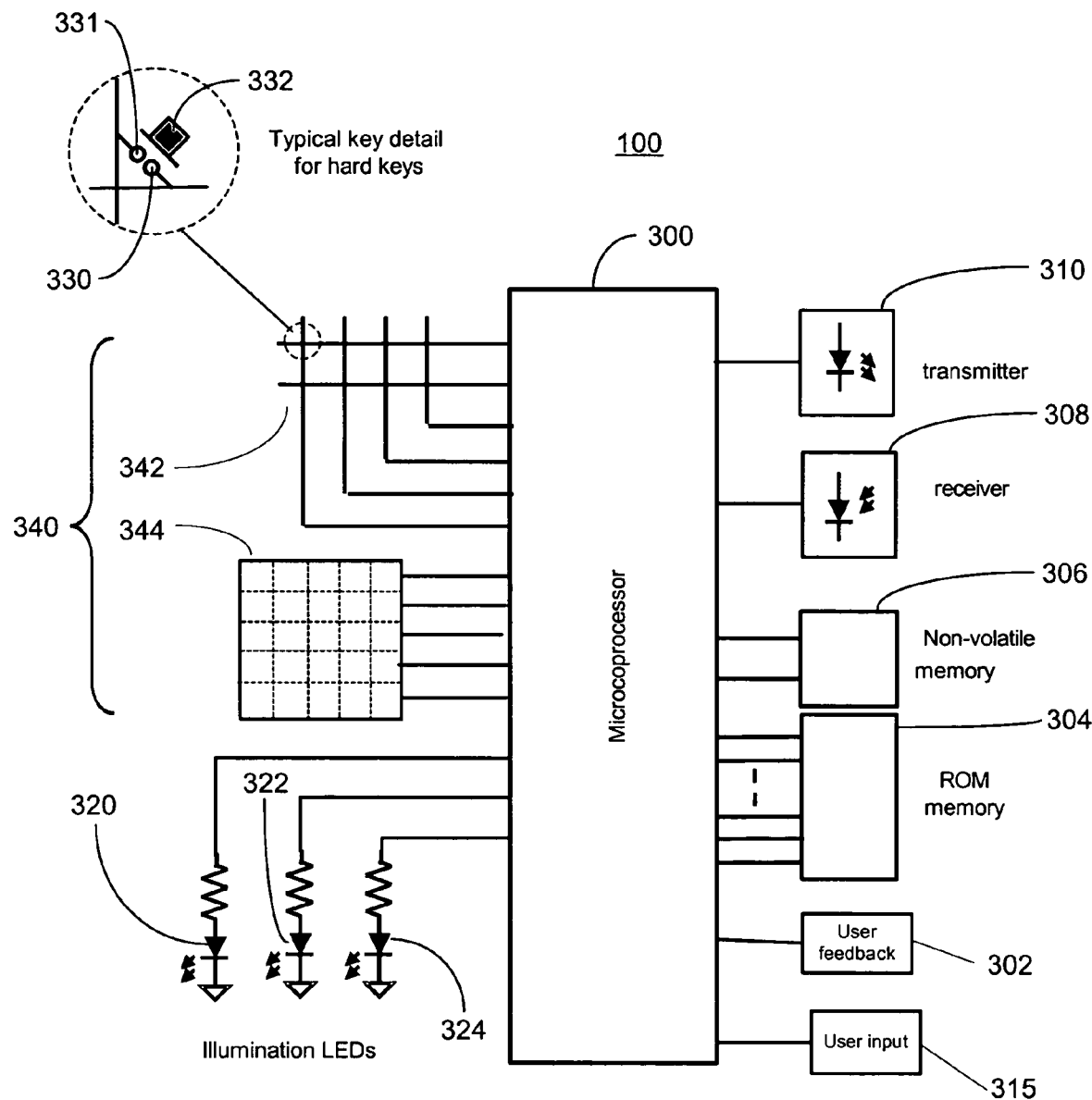
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a key matrix 340 (e.g., soft keys 344 such as a touch sensitive surface placed over an underlying surface on which key icons are printed or etched alone or combined with hard keys 342, a touch sensitive surface placed over a liquid crystal display (LCD) or an electroluminescent display (EL), etc.), transmission circuit(s) 310, receiver circuit(s) 308 and/or transceiver circuit(s) (e.g., IR and/or RF), a non-volatile read/write memory 306, a means 302 to provide feedback to the user (e.g., LED, display, speaker, and/or the like), a means 315 (such as a microphone, etc.) for receiving additional non-keypress input from the user, and means for providing visual and/or audio cues to the user, as illustrated in FIG. 2.

The means for providing visual and/or audio cues to the user so as to disseminate information to the user may be embodied as key illumination means, a device face illumination means, a sound or voice synthesizer circuit and/or a digital recording and playback circuit (for example to allow a user to playback sound or voice tags input via a microphone or otherwise downloaded into the controlling device). The key illumination means may be in the form of separate elements, such as LEDs 320, 322, and 324, either directly associated with a hard key matrix or used for indirect general illumination of an area such as in the case of an internally illuminated translucent display panel, i.e., a face panel that allows all or some incident light to pass completely through it, or may be integrated as part of the key matrix, for example in the case where the key matrix is implemented using a touch screen display overlaid on an LCD, EL or ink screen printed display panel. In the case where the controlling device 100 includes hard keys, an exemplary molded-in key 332 is shown as operative with key matrix circuit 330,331.

As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, control the key illumination means 320, 322, and 324, sound circuits, device face illumination means, etc. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 is adapted to be responsive to events, such as a sensed user interaction with the key matrix 340, receipt of a transmission via receiver 308, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance, e.g., STB 104, in a format recognizable by that appliance. It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, user programming of favorite channel selections, etc. A further, local operation is the ability to "lock" function keys across device operational modes as described in previously referenced U.S. Published Patent Application No. 2003/0025840. Examples of still further local operations can be found in U.S. Pat. Nos. 5,481,256, 5,959,751, and 6,014,092.

Figure 3:
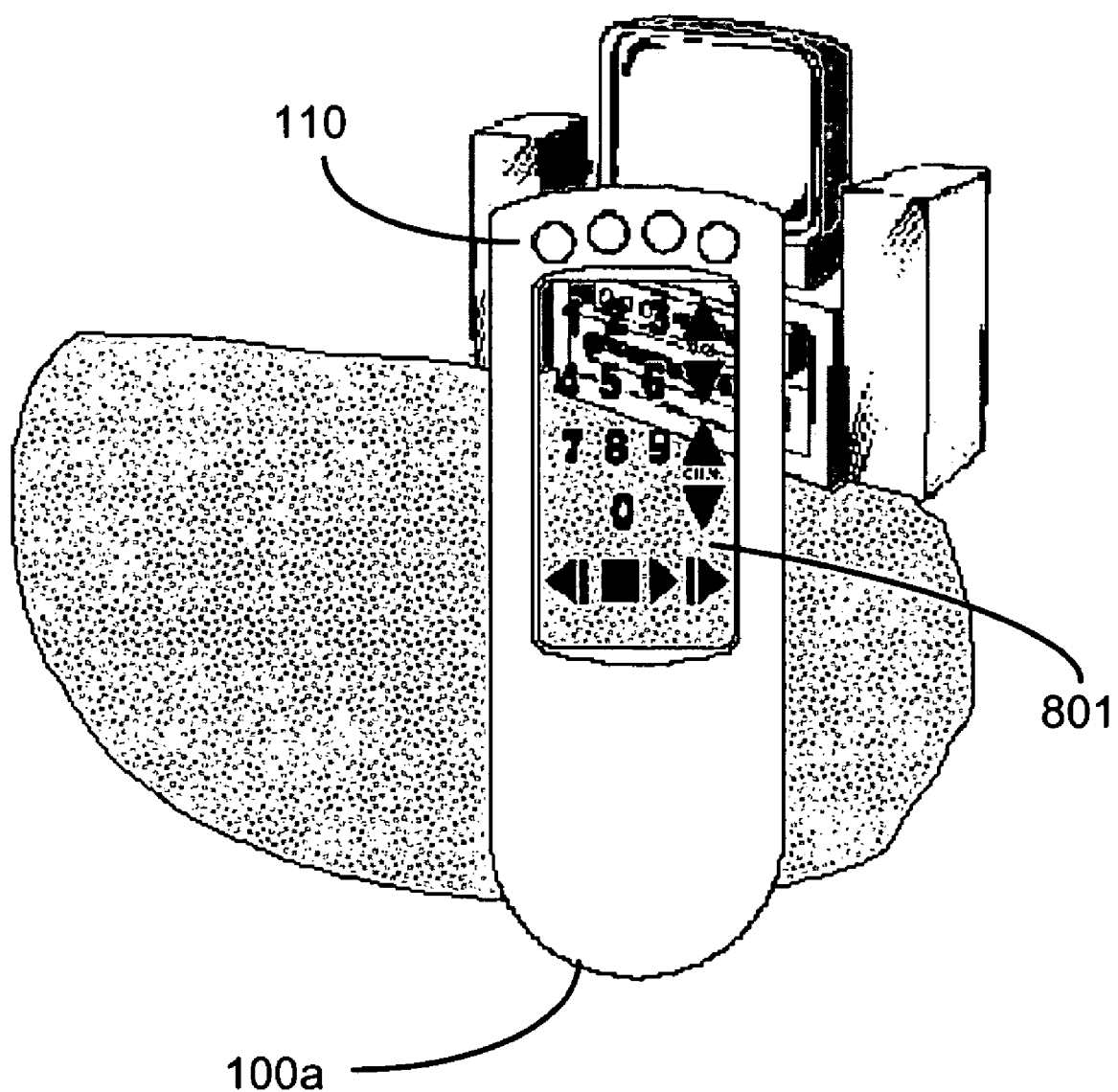
FIG. 3 illustrates an exemplary controlling device having an internally illuminable, translucent device face.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. By way of example, FIG. 3 illustrates a translucent face controlling device 100a having a "TV" operational mode, a "CAB" (cable box) operational mode, an "AUX" operational mode, and a "DVD" operational mode which are selectable through activation of a corresponding device mode selection keys 110 (in this regard, see also keys 110 in FIG. 4 for a more detailed view). Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that a controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figure 4:
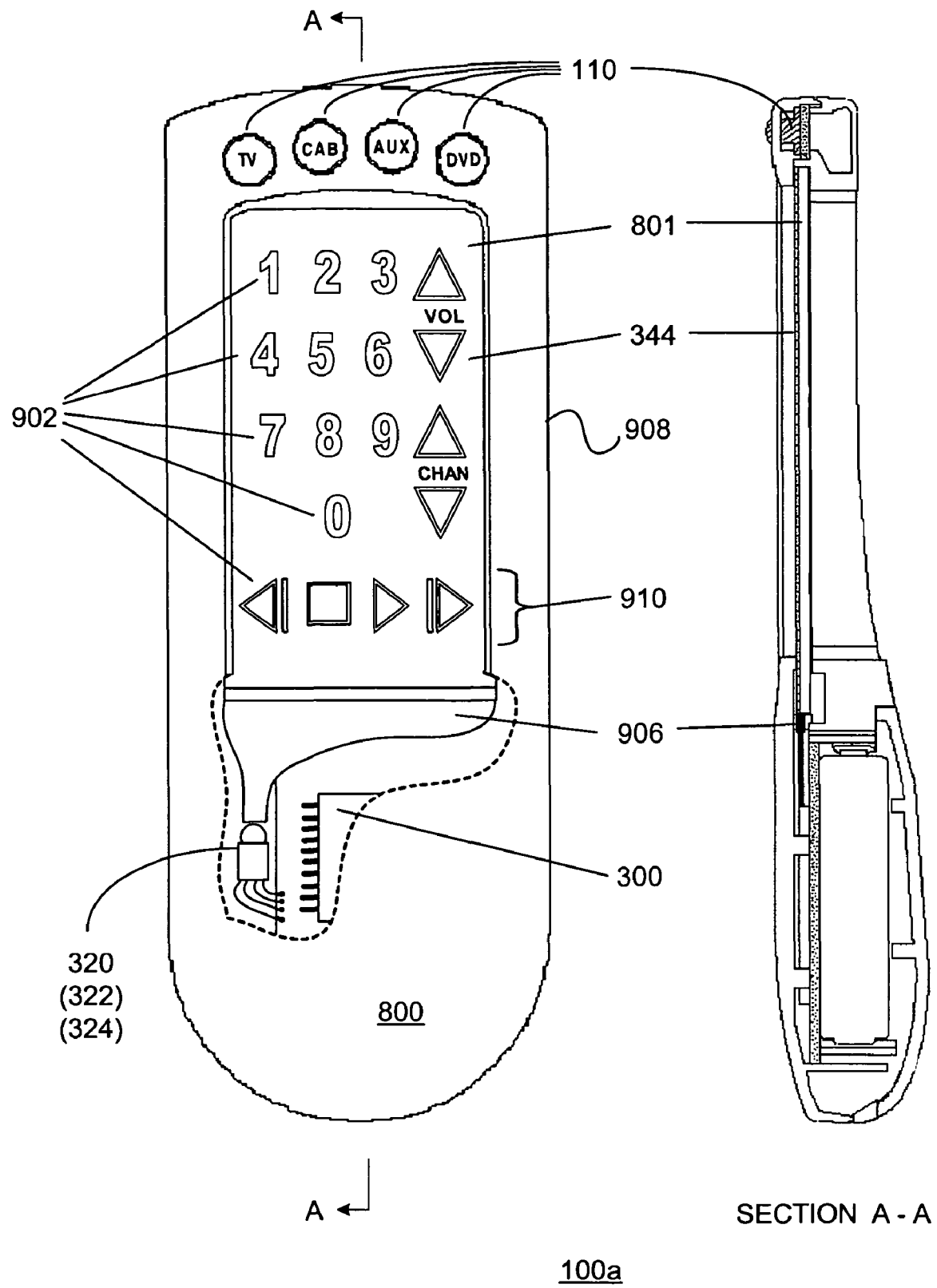
FIG. 4 illustrates the construction and key configuration of an exemplary controlling device having an internally illuminable, translucent device face.

FIGS. 3 and 4 illustrate a controlling device 100a having a translucent display face 801 (i.e., a face that allows for the passage of at least some incident light). The display face 801 is preferably made from a light conducting material and includes an overlay with touch-sensitive keys. It will be understood that various materials with differing degrees of light pass-through may be used in the construction of the translucent display face 801 without departing from the spirit of this invention. Accordingly the term "translucent" is intended to include all possible degrees of light transmissivity and dispersion, spanning the gamut from fully transparent (100% transmissivity with no dispersion or scattering) through almost opaque (low tranmissivity and/or high dispersion/scattering.)

Referring to FIG. 4, display face 801 is printed or etched with one or more icons 902 representative of various controlling device keys, e.g., operational mode and function keys. Overlaying display face 801 is a touch panel 344 comprising a matrix of touch sensitive segments corresponding to the printed icons, such that touches to the area of each individual icon form uniquely identifiable inputs to microcontroller 300 for causing the controlling device to perform an activity, such as transmitting commands to an appliance, entering a mode of operation, etc., all of which is well known in the art. Where desired, hard keys, for example device mode selection keys 110 in the illustrated embodiment, may also be provided.

Display face 801 may be internally illuminated by one or more sources of light energy—either visible or outside of the visible spectrum. In the illustrated example, the sources of light energy comprise LEDs 320, 322, 324 which transmit light via a light guide 906 (for example, a bundle of optical fibers) attached to the bottom edge of the display face. It will be appreciated that in general LEDs 320-324 may comprise separate individually colored LEDs or may comprise a single multi-color capable component as illustrated. In this manner, the entire display face 801 may be illuminated in different colors by energizing different of LED groups and/or different elements in a multi-colored LED group.

In an alternative embodiment (not illustrated) illumination LEDs may be positioned around the circumference of the display face 801, for example within openings formed in the sides of the material from which the case 908 is formed. Again, these LEDs may include groupings of one or more single colored LEDs and/or multi-colored LEDs distributed about the outside of the display face 801. In this embodiment, when one or more LED groupings are illuminated, an area of display face 801 is illuminated the corresponding color. The display face 801 may thus be simultaneously illuminated in multiple, different color zones by energizing different combinations of LED groups and/or by energizing different combinations of elements in a multi-colored LED group.

Additional methods for selectively illuminating the display face internally may be possible without departing from the spirit and scope of the current invention, for example, a single color LED (i.e., a white light LED) may be used in conjunction with one or more color filters and/or lenses mechanically operable to cause different illumination colors or hues within the display face. It will also be understood that well known translucent LCD methods may be used to accomplish the various aspects and features contemplated by the current invention, either independently or in conjunction with other display illumination techniques described herein. For example, translucent LCD's effectively mask or filter light passing through portions of the display, and may be used in conjunction with light sensitive inks and other illumination and coloring techniques described herein to present a rich functional environment to a user or users.

Yet further, the function keys and/or function key background may be illuminated a color to indicate in which user operational mode or which room operational mode the controlling device 100 is currently placed into. For example, the display face 801 may be illuminated red when the controlling device is currently in one user's operational mode (e.g., the remote control is configured to use their favorites, macros, etc.) and may be illuminated green when the controlling device is placed into another user's operational mode.

As noted, a color indicative of an intended target appliance that is associated with a function key, a user mode, or a room mode may be achieved by illuminating one or more appropriately colored LEDs (or LED elements) that are associated with the function key (e.g., in the case of "hard" keys) or display face (e.g., in the case of "soft" keys). In this instance, a cue (color or sound) that is selected so as to be indicative of an intended target appliance, user operational mode, or room operational mode may be predefined or user-selectable (e.g., a user may select a color or sound from a menu, by stepping through various color or sound choices, by being downloaded and assigned, etc.). Furthermore, the absence of a color and/or sound may also be used to provide information to the user.

In the case where operational modes are to be indicated to the user, such as user operational modes or room operational modes, it will be appreciated that all or part of an entirety of the functions keys or display face may be illuminated as described above to cause an information providing color to be presented to the user. By way of further example of indication of a user operational mode, remote control 100b of FIG. 5, configured for use with a satellite set top box including an integrated DVR, includes channel scan buttons 1002, 1004 which may be programmed by a user to scan back forth through a favorite subset of the greater universe of all available channels. Remote control 100*b* also supports up to four individual users, each with their own set of favorite channels, via four user selection buttons 1006. The user currently selected may advantageously be indicated by the illumination of the face panel in a color corresponding to an indicia 1008 (e.g., a colored ring) associated with that user's selection button.

The ability to independently illuminate (or in the case of a translucent LCD, mask or filter) various parts of the controlling device 100, e.g., the keys and/or display, with different light wavelengths (i.e., light colors) may be used to advantageously provide a user of the controlling device 100 with a visual indication as to which appliance a command should be transmitted to (e.g., the intended target) when a function key is activated. For example, a color association between a function key and an appliance may be used to provide a user with information indicative of which function keys are locked to which appliances across the various "device" modes. Still further, the color association between a function key and an appliance may be used to provide a user with information indicative of which function key is assigned to which appliance when multiple appliances are controllable from a user interface, e.g., when the controlling device 100 is in a "home theater" operational mode.

Figure 5:
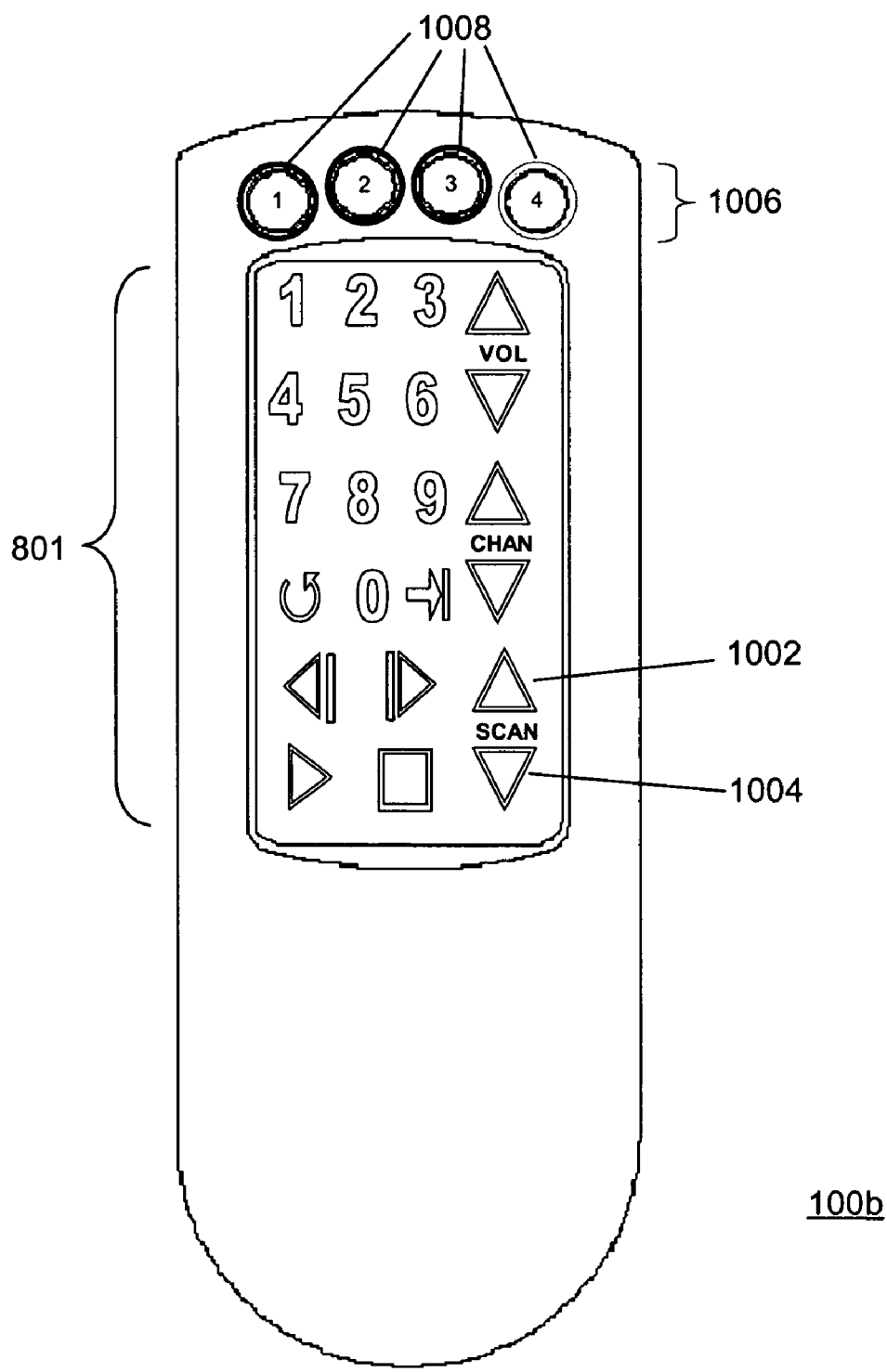
FIG. 5 illustrates a second exemplary key configuration of a controlling device having an internally illuminable, translucent device face.

In an alternative embodiment of the remote control of general type 100 as illustrated in FIGS. 3, 4, and 5, the remote control 100*d* of FIG. 6 uses dual sources of energy, e.g., light guides 1302, 1304 together with independently activatable multicolor LEDs 1306, 1308, to provide visual indication of the current device assignments of function keys, such as the volume and channel keys as is described in the following paragraphs. To further enhance the visual indication provided by the sources of energy, small grooves 1310, 1312 may be formed in the underside of the transparent face panel 801 for the purpose of deflecting light generated by light sources 1302, 1304. In one embodiment, enhanced visual indication may be achieved through use of the principle that light incident on a boundary between a dense medium and a less dense medium will be internally reflected whenever the angle of incidence is greater than the so-called "critical angle." This critical angle θ may be expressed as $\theta = \arcsin(n_2/n_1)$ where $n_2$ is the refractive index of the denser medium and $n_1$ the refractive index of the less dense medium.

Figure 7A:
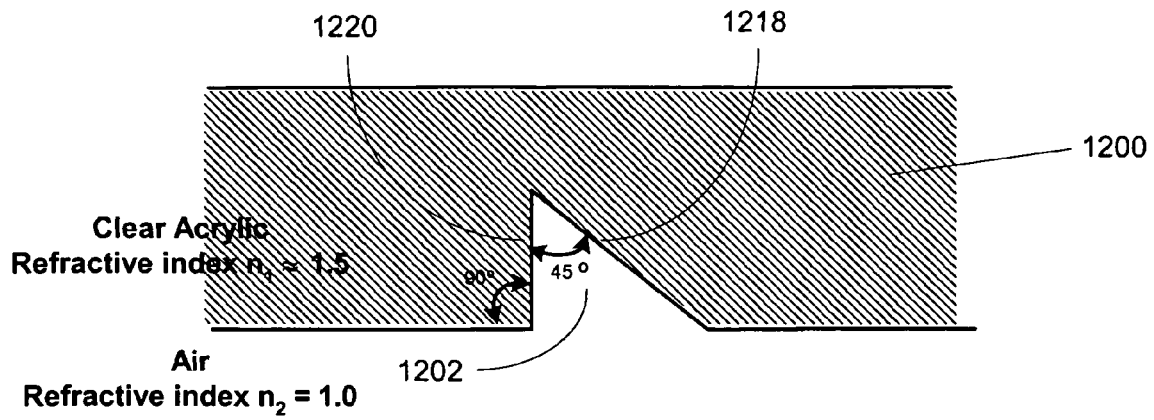
FIG. 7 illustrates an exemplary method for creating markings on the underside of a clear plastic sheet, which markings are responsive to illumination from a particular direction.
Figure 7B:
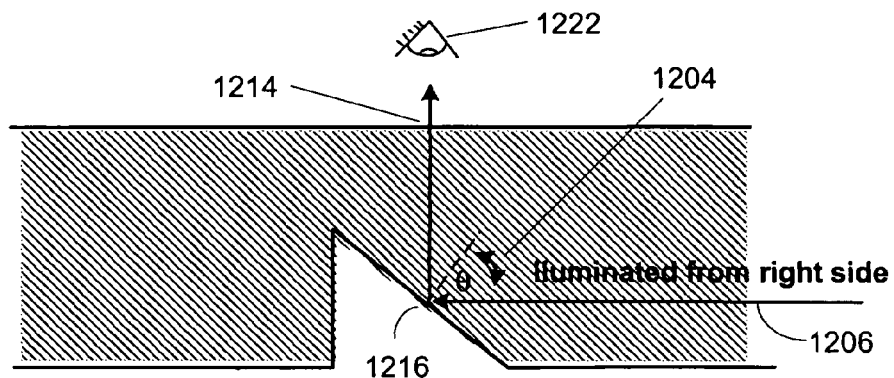
Figure 7C:
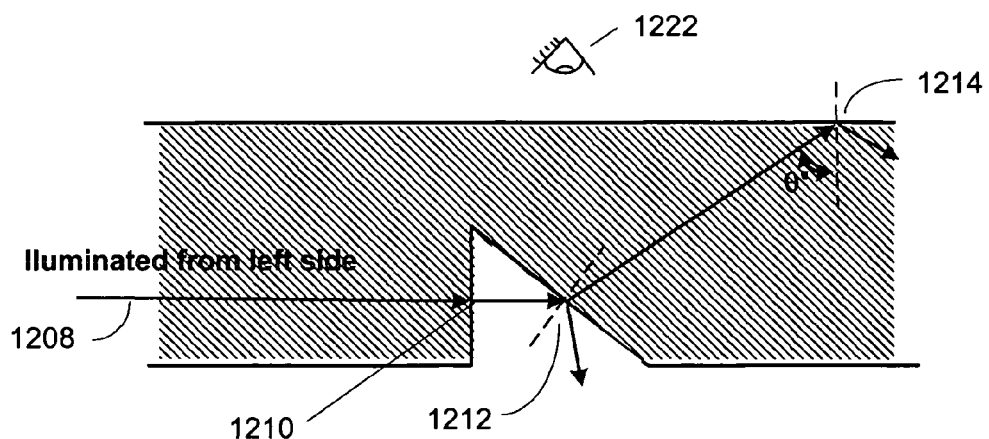

By way of example, in the case of a boundary between clear acrylic (n≅1.5) and air (n=1.0) the critical angle is approximately 41 degrees. Turning now to FIG. 7*a*, an exemplary groove 1202 with one perpendicular wall 1220 and one approximately 45 degree angled wall 1218 is provided on the rear surface of a transparent acrylic sheet 1200. As illustrated in FIG. 7*b*, if this groove is illuminated by a light source 1206 directed into the edge of the acrylic material on the side corresponding to angled wall 1218, the angle of incidence 1204 (θ>~41°) will be such that the light is internally reflected within the acrylic material and exits through the upper surface 1214, that is, is visible to a viewer 1222 looking into the acrylic sheet from the top. Conversely, as illustrated in FIG. 7*c* if groove 1202 is illuminated from the opposite side by a different light source 1208, that light will pass directly through perpendicular wall 1210 (incident light that is normal to a boundary passes through unchanged) and strike the angled wall from the opposite side 1212. However, since in this instance the light is traveling from a less dense to a more dense medium, the phenomenon of internal reflection does not apply and in general part of the light may be reflected away from the viewer and part refracted back into the acrylic material (which then acts like a light guide, e.g., as shown at 1214). Regardless, substantially none of this light 1208 is directly visible to viewer 1222. It will thus be appreciated that, when light 1206 and light 1208 are simultaneously directed to a graphical user interface element including the indentation 1202, the light 1206 will predominate relative to the light 1208 in the visual appearance provided to the graphical user interface element including the indentation 1202. It will also be appreciated that, by providing multiple grooves facing in different directions, indicia which are responsive to different light sources may be provided on the underside of such a transparent surface.

Figure 6:
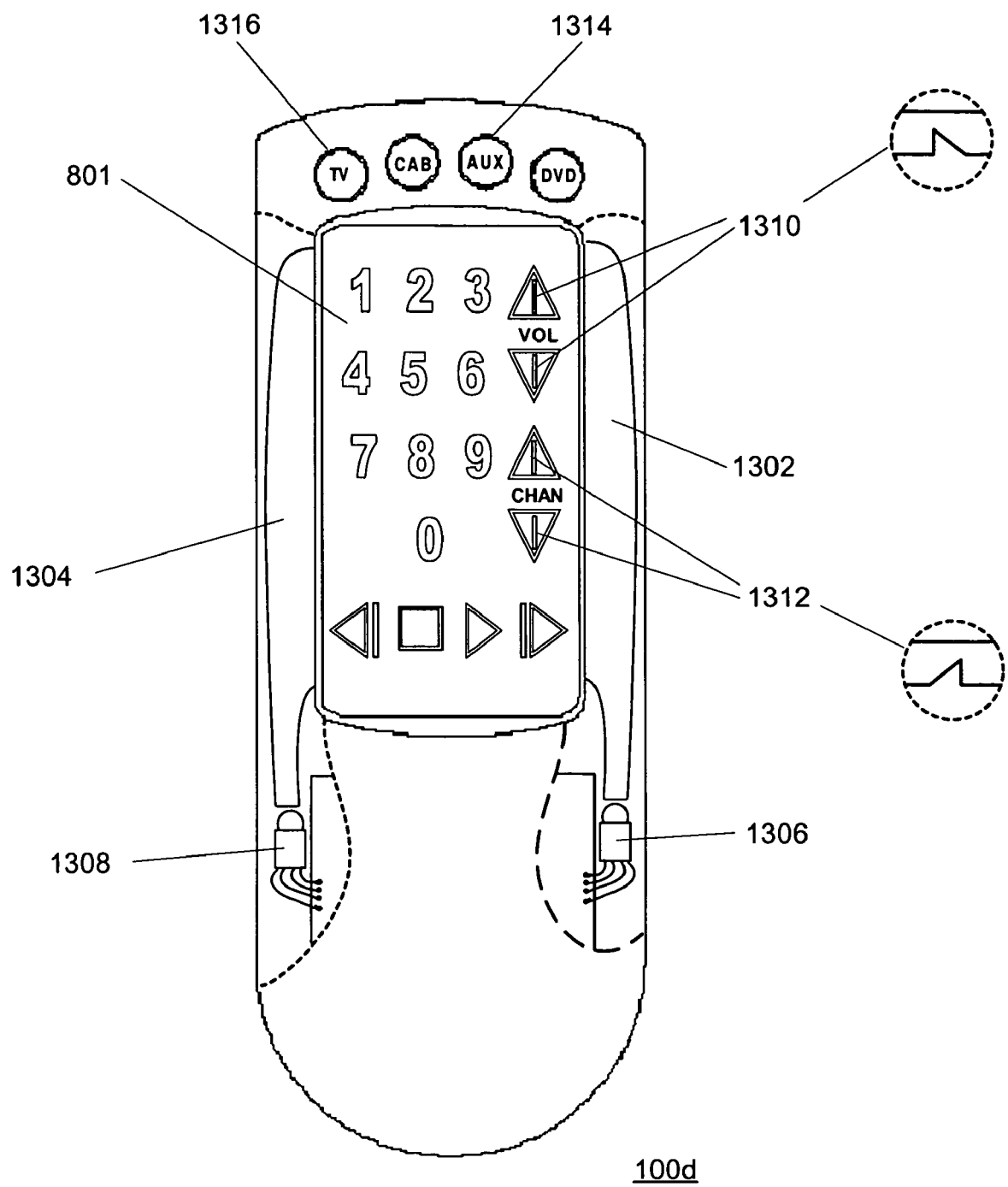
FIG. 6 illustrates another exemplary configuration of a controlling device having an internally illuminable, translucent device face, whereby indicia may be selectively highlighted to indicate different functionality assigned to different keys.
Figure 8:
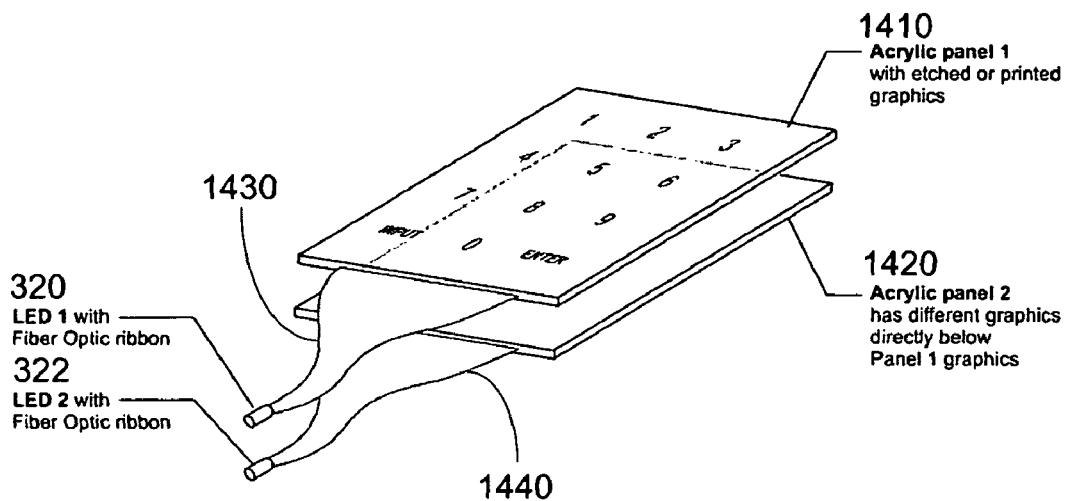
FIG. 8 illustrates an exemplary configuration of a multi-layered internally illuminable translucent device face for use in a controlling device.
Figure 8:
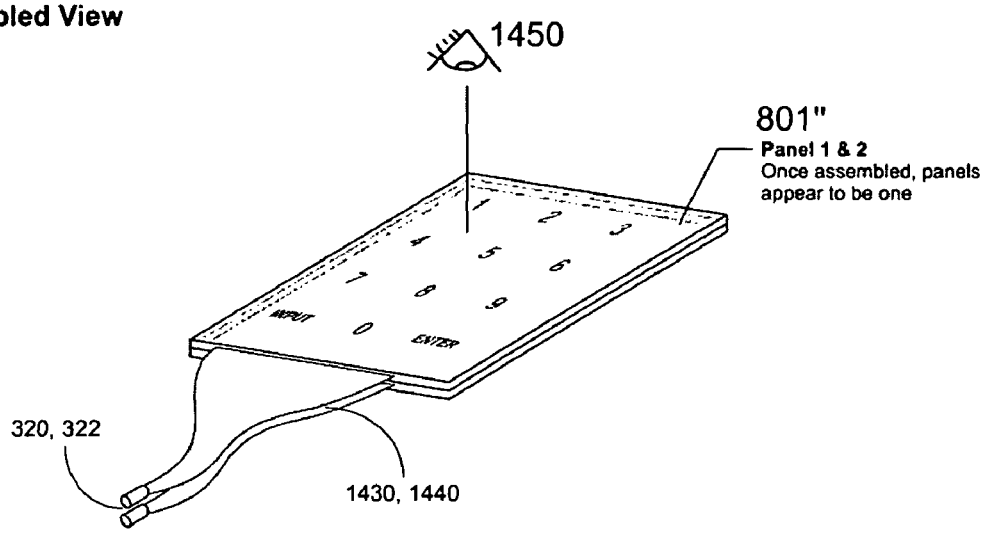

Returning now to the exemplary remote control 100*d* illustrated in FIG. 6, it will be understood that if, for example, grooves 1310 and 1312 are opposite facing in the manner illustrated in FIG. 8 and described above, e.g., one groove having a left side angled wall and the other groove having a right side angled wall, these grooves 1310 and 1312 may be selectively illuminated in different colors via light guides 1302, 1304, e.g. from light energy originating from the right side and left side of the panel 801, respectively, thereby enabling the selective illumination of, for example, the illustrated volume and channel keys using device-indicative colors.

By way of a more detailed example, if the volume function of remote control 100*d* were currently assigned to the "AUX" device (e.g., a receiver/amplifier) associated with mode key 1314 (assigned the color green in this example) and the channel functions of remote control 100*d* were currently assigned to the "TV" device associated with mode key 1316 (assigned the color red in this example), then these assignments could be conveyed to the user by simultaneously energizing the red element of tri-color LED 1308 and the green element of tri-color LED 1306. In such a case, red light from LED 1308 would be injected into the left edge of panel 801 via fiber optic light guide 1304, while green light would be simultaneously injected into the right edge of panel 801 via light guide 1302. In accordance with the teachings presented earlier in conjunction with FIG. 12, it will be appreciated that this will thus cause grooves 1310 below the volume keys to appear green to the observer 1222 and grooves 1312 below the channel up/down keys to appear red to an observer 1222, given the orientations of grooves 1310, 1312 depicted in FIG. 8.

It should be understood that the foregoing describes various exemplary methods for providing cues to a user of a controlling device. It should also be understood that the methods described and illustrated are provided by way of example only and are not intended to be limiting. For example, the illustrated and described indicia may be of varying widths and sizes and may take the form of single lines, blocks, icons, patterns of interleaved indentations facing in different directions, etc. Indicia also need not be associated with specific individual keys but may alternatively be associated with groups of keys or areas on the face of the remote control by forming boxes, circles, highlight lines, arrows, etc. It will be further appreciated that the patterns of grooves and/or indentations comprising such indicia may be formed on the underside of a transparent material by cutting, grinding, molding, etching, stamping, embossing, or any other convenient manufacturing process. It will also be appreciated that while the illustrative embodiment described above utilizes an arrangement of LEDs with fiber optic light guides pipes as the source of light energy to illuminate the indicia, various other sources of light energy, e.g. electroluminescent strips, peripherally arranged LEDs, etc., or even ambient light, may alternatively be used without departing from the spirit of the invention.

In yet another embodiment, selective illumination of individual layers of a multi-layer panel may be used to effect the display of different icons or labels for a single physical key location, depending upon the device to be controlled. Referring to FIG. 8, a translucent face panel 810" may be constructed from multiple layers of material 1410, 1420 each etched with a different set of symbols. Individually activable light sources 320, 322 directed into the edge of each layer via fiber optic light guides 1430, 1440 allow for selective illumination of individual sets of symbols. Since the planar surfaces of the material confine each source's light output within the layer into which it is directed, only those areas of the face panel where the light is scattered and/or reflected by the etched symbols appear luminous to a viewer 1450 located normal to the face panel. In this manner, the symbols on the currently illuminated layer are brought into prominence relative to those symbols present on other, non-illuminated, layers. It will be appreciated that while the foregoing description is in terms of etched symbols, in practice any technique which causes an alteration in the reflectivity of the material's inner surface is effective: etching, engraving, screen printing, machining, etc. Also, while the illustration of FIG. 8 depicts only two layers for the sake of simplicity, it will be appreciated that the technique described may be applied to as many layers as desired subject only to the practical limits of material transmissivity and finished panel thickness.

By way of further example, turning now FIGS. 9*a* through 9*d*, in a remote control 100*c* with a three-layer face panel 801" of construction similar to that described above in conjunction with FIG. 8, individual layers of panel 801" may be marked with different sets of icons. For reference, the face panel illustrated in FIG. 9*a* includes all possible symbols, i.e. is a composite of all three layers. For example a single key location 1102 may include the label "9" 1104 in layer one, the label "Guide" 1106 in layer two, and the label "Angle" 1108 in layer three. Illumination of the respective individual layers may thus be used to bring different sets of labels or icons into prominence (relative to the remaining labels), depending upon the current device being controlled, as will now be discussed further in conjunction with FIGS. 9*b* through 9*d*.

Figures 9A, 9B:
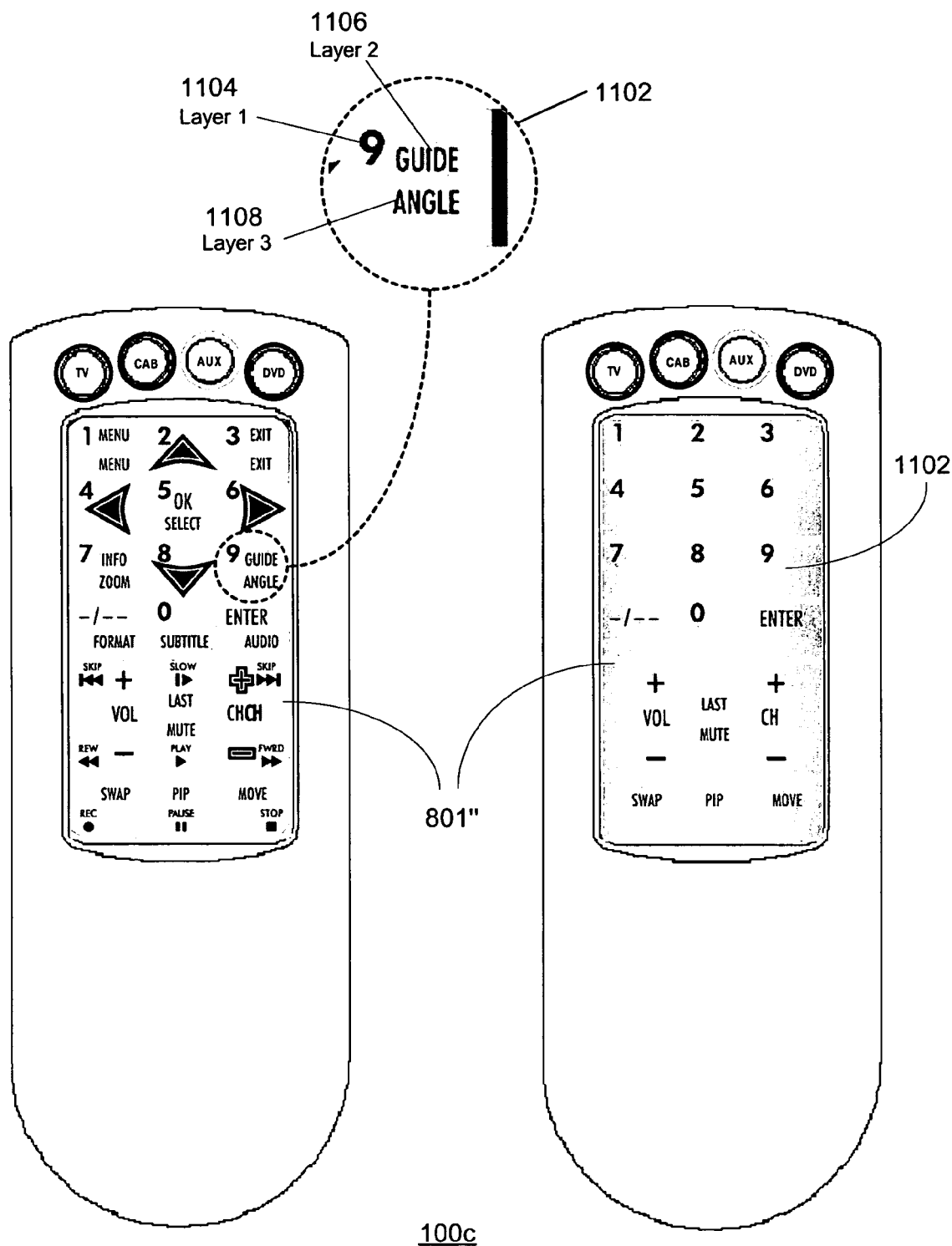
FIG. 9 illustrates a third exemplary configuration of a controlling device having an internally illuminable, translucent device face, whereby key icons may be selectively highlighted to indicate different functionality in different modes of operation.
Figures 9C, 9D:
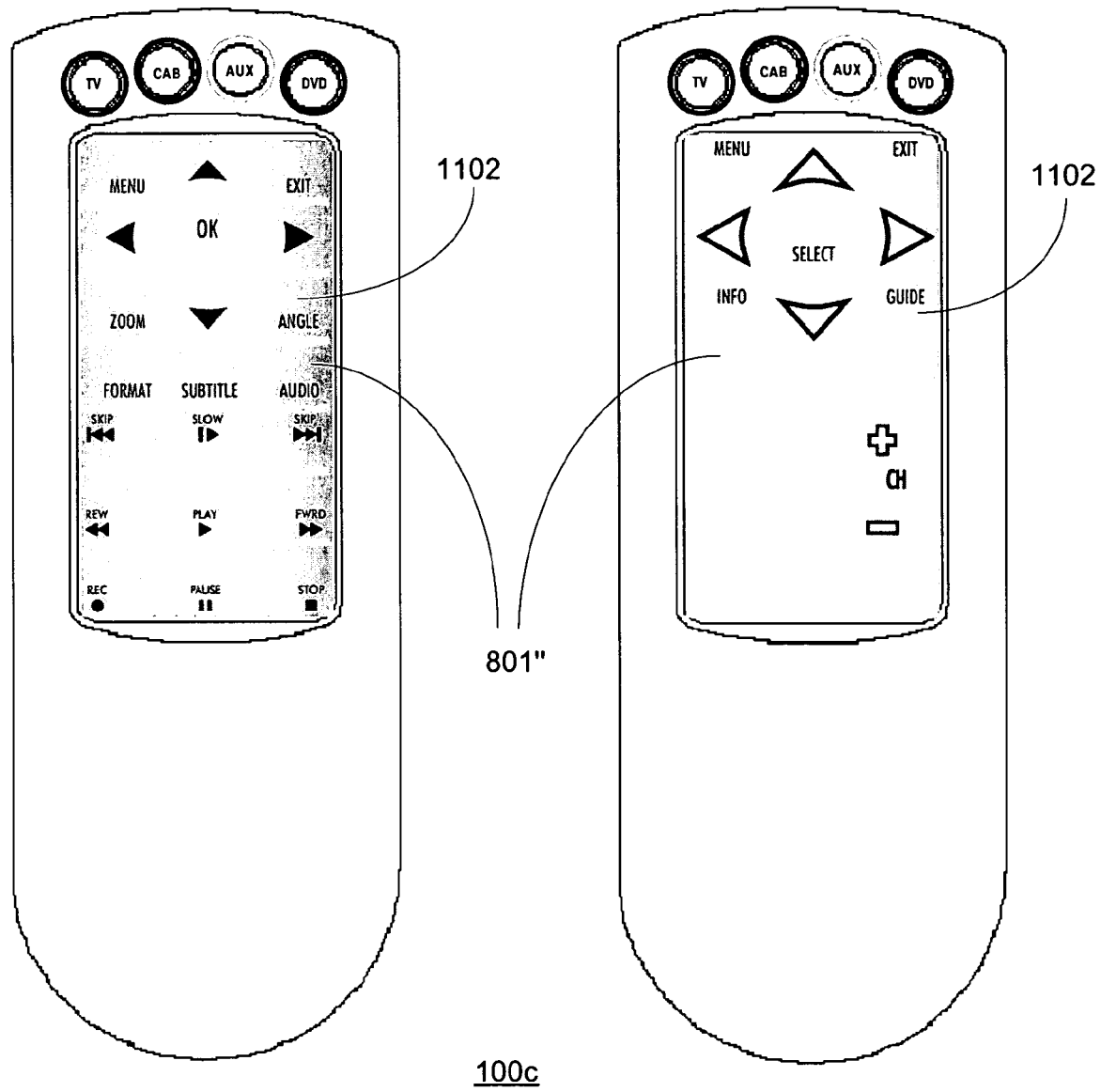

FIG. 9*b* illustrates an exemplary appearance of face panel 801" when layer one of face panel 801" is internally illuminated (in the illustrated example, the user interface displayed corresponds to the TV device mode in which the labels etched into layer one are more prominently displayed relative to the other labels); FIG. 9*c* illustrates an exemplary appearance of face panel 801" when layer two of face panel 801" is internally illuminated (in the illustrated example, the user interface displayed corresponds to the DVD device mode in which the labels etched into layer two are more prominently displayed relative to the other labels); and FIG. 9*d* illustrates an exemplary appearance of face panel 801" when layer three of face panel 801" is internally illuminated (in the illustrated example, the user interface displayed corresponds to the Cable device mode in which the labels etched into layer three are more prominently displayed relative to the other labels). A comparison of the apparent display at key location 1102 across FIGS. 9*b* thru 9*d* will more clearly illustrate this principal. Although the renderings in FIGS. 9*b* through 9*d*, which are provided for convenience of illustration, do not depict the non-active icons or labels at all, it will be appreciated that in practice these labels may still be faintly visible: it is the intent of the invention to bring the active icon or label into prominence, not to render the non-active icons and labels completely invisible, although such may be possible. In general, to achieve the benefits of this invention it is sufficient that the non-active icons and labels be of low perceived visibility relative to the icons or labels associated with the active key functions.

In further embodiments, the layered approach described above may be combined with other techniques, for example the directionally sensitive grooving of FIGS. 6 and 7, use of multicolored LEDs for layer illumination (either alone as described in conjunction with FIGS. 4 and 5 or in conjunction with printed indicia using inks responsive to particular wavelengths of light as more fully described in co-pending U.S. patent application Ser. No. 10/922,673 of like assignee), etc., to provide even greater flexibility in adapting the user interface of a universal remote control to the activity being performed.

Still further, as described in commonly assigned, co-pending U.S. patent application Ser. No. 10/702,757 the indicia provided to the various layers of the multi-layered display face may also include one or more complete function key images and/or fragments of complete function key images whereby one or more of the layers and indicia may be selectively illuminated to present multiple, different remote control user interfaces each having one or more complete function key images. Specifically, a complete function key image presented as part of a remote control user interface may be a complete key image that was included as part of an illuminated layer or a complete key image may be formed by a combination of function key image fragments included as part of multiple layers being selectively illuminated. Preferably, the function key image fragments on the various layers are disposed in general alignment to allow for the formation of a complete function key image when selectively illuminated. Thus, in such an embodiment, multiple user interfaces may be accomplished by providing a plurality of layers wherein each layer is individually illuminable and each layer has at least one image fragment such that the plurality of layers are illuminable in various combinations (and possibly various colors) to cause image fragments of illuminated layers to be combined in various combinations (and possibly having various colors) to form various complete images for use in connection with the key matrix. This technique may be used to provide multiple different complete images for use in connection with a single key element in the overlay.

Figure 10:
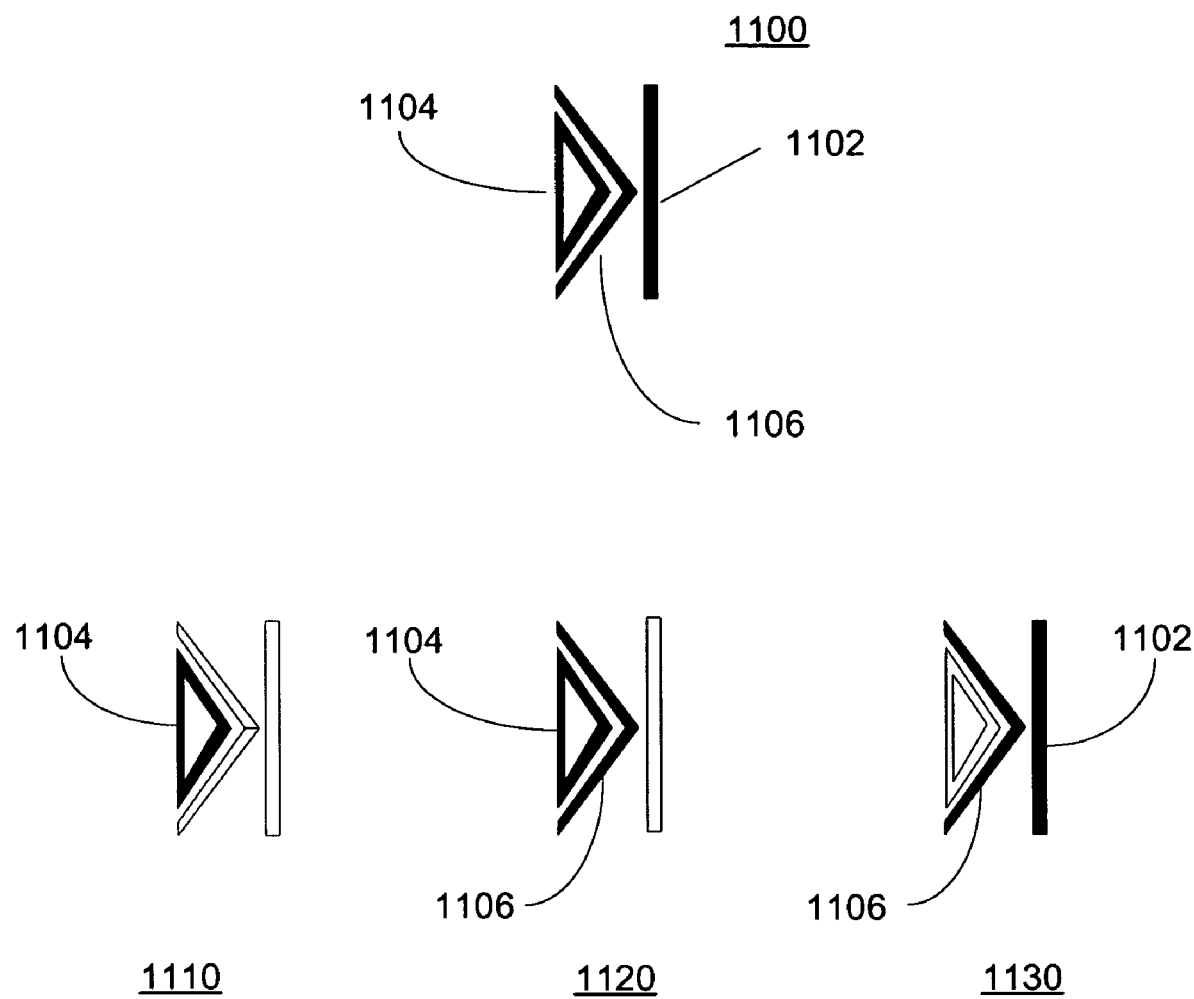
FIG. 10 illustrates an embodiment of a controlling device having an internally illuminable, translucent device face, whereby image fragments may be selectively highlighted to indicate different complete key icons.

By way of example, FIG. 10 illustrates how three image fragments 1102,1104,1106 (shown together at 1100) disposed on three different layers of a translucent face panel may be selectively illuminated to form various images. When only the layer corresponding to fragment 1104 is illuminated, a symbol 1110 appropriate for a menu navigation "right" function key is formed. When the layers corresponding to fragments 1104 and 1106 are illuminated, a symbol 1120 appropriate for a "fast forward" function key is formed. When the layers corresponding to fragments 1102 and 1106 are illuminated, a symbol 1130 appropriate for a "skip to end" function key is formed. It will be appreciated that the formation of more complex symbols is possible by the use of a greater number of smaller image fragments as more fully described in the above referenced U.S. patent application Ser. No. 10/702,757.

It will further be understood by those skilled in the art that the particular methods and techniques used to effect responsiveness to light energy in a display element may include phosphorescence, fluorescence, reflectivity, diffusion, filtering, absorption, Lasing, and other techniques. In this regard, combinations of conventional and/or photochromatic inks may be utilized to imprint labels on a display element and appropriate corresponding sources of energy utilized to bring desired user interface elements into prominence. Additionally, translucent LCD techniques which make use of selective masking or filtering of ambient light passing through the face panel may be used, either alone or in conjunction with the above techniques to create areas of selective prominence on the face panel to present to a user. Furthermore it will be appreciated that the light wavelength, range of wavelengths, or other electromagnetic energy signals used to interact with a given display element may differ from the actual visible light color experienced by a user, for example, an ultraviolet (UV) light source may be used to illuminate a fluorescent display element. Another strategy is to use interference filters to change viewing angles so that the color changes with the viewing angle. Still further, it is contemplated that heat energy may be used to cause the inks of certain labels, e.g., imprinted using thermochromic inks, to appear more prominently relative to other labels.

It will also be appreciated that one goal of the present invention is to maximize the transparency of the face panel 801 while still allowing for various display portions to be selectively brought to prominence to enhance user interaction. As such, those skilled in the art will understand that varying levels of transparency for the face panel are possible given appropriate combinations of the illumination source and the particular chemical composition, fabrication, or physical makeup of each icon and/or label.

It is to be additionally appreciated that the concepts described herein may also be utilized to convey to a user of the controlling device a state of an appliance being operated, which state information may be conveyed within the graphical user interfaces using colors, symbols, etc. To this end, state information may be conveyed from an appliance to the controlling device, maintained internally within the controlling device, or be provided to the controlling device from a third appliance responsible for tracking the state of the appliance, such as described in commonly assigned, co-pending U.S. patent application Ser. Nos. 10/979,352 and 10/694,582. State information may then be communicated to the user by, for example, causing an image to be illuminated a certain color (e.g., a image representative of a "play" transport command may be illuminated red when the appliance has stopped playing media, be illuminated green when the appliance is playing media, be illuminated yellow when the appliance has paused in the playing of media, not be made visually prominent when the appliance does not have playable media loaded therein, etc.); causing an image to be altered in appearance (e.g., one or more layers may be adapted to display an icon representative of a transport key function and, when the appliance is performing the transport function, to cause an image positioned in proximity to the icon representative of the transport key function to be made more visually prominent to thereby display an indication of the active state of the appliance); causing an image to be made more prominent using a pattern (e.g., by strobing the source of illumination), etc. Various combinations of these methods for conveying information as part of graphical user interfaces may be utilized without limitation.

While the foregoing describes controlling devices 100 that use color or selective illumination (separately or together) to disseminate information, it is contemplated that other identification schemes (which may be used in addition to or in lieu of color) may be provided to similarly indicate relationships between function keys and appliances, the controlling device and user operational modes, and/or the controlling device and room operational modes. For example, information may be provided by controlling the tint, contrast, or brightness of displayed function keys and/or area(s) visually associated with function keys, a display face, etc. Still further, information may be provided by providing a visually identifiable pattern, shape, icon, or alphanumeric tag to a function keys and/or area(s) visually associated with function keys (e.g., imposing a crosshatch or other pattern on all function keys associated with a particular appliance, using commonly shaped function keys for an associated appliance, surrounding each function key with (or appending in super/subscript fashion) a shape or icon representing the associated device, appending an alphanumeric tag on or near a function key indicating the associated appliance, etc.). Yet further, information may be provided by using a distinct audible sound tag. Distinction between the sound tags may be achieved by allowing sounds to repeat in different numbers, emitted using different frequencies, and/or emitted in different sequences/patterns. Distinct sound tags may also be generated using a voice synthesizer. Such sound tags may also be in the form of sound labels that may be recorded via a microphone of the controlling device and later played back via a speaker of the controlling device. Again, recorded sound tags may be user spoken voice labels. In this manner, an event such as activation of a function key, movement of the controlling device, etc. may cause the controlling device to emit a sound tag whereby information is disseminated to the user.

In some instances it may also be desirable to allow a user to hear a sound tag prior to an action that is associated with that sound tag being performed by the controlling device. For example, function keys may be provided that, when depressed a first time cause their associated sound tag to be emitted from the remote control and then, when pressed a second time, cause the remote control to perform an action that has been associated with that function key, e.g., to cause the transmission of programmed macro commands. Preferably, the action is performed only if the function key is activated a second time within a predetermined time-out period which is initiated after the first activation of the function key which caused the emission of the sound tag. Yet further, function keys may be provided that cause the emission of a sound tag when slightly depressed and which cause the action associated with that function key to be performed when the function key is more fully depressed. In either instance, it is to be understood that the use of sound tags allows a user to identify what function or functions will be performed in response to activation of a function key which is particularly useful in the case of macro keys which are usually unlabeled or blank programmable keys provided on a controlling device.

While various concepts have been described in detail, it will be appreciated by those skilled in the art that various modifications and alternatives to those concepts could be developed in light of the overall teachings of the disclosure. For example, it should be appreciated that particularly where controlling devices having multi-color display screens are involved (i.e., PDA or other LCD based controlling devices), many combinations and variations of the above described function key association features are possible without departing from the spirit and scope of the present invention. Further, while the embodiments presented above generally use a touch sensitive key matrix overlaid on the display area as an input method, it will be appreciated that other methods for example hard keys arranged around the edges of a selectively illuminable display area are also possible. Additionally, while the embodiments presented above are described in the context of universal remote controls (i.e. controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e. display screens, signage devices, teleprompters, etc) without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A display for providing a device with a graphical user interface, comprising a panel having both a touch-sensitive surface and a plurality of translucent display portions arranged in overlapping relation wherein each display portion is individually illuminable by being provided within light energy from a source of light energy and each display portion has an image which responds to its corresponding display portion being provided with light energy from its source of light energy by becoming more visibly prominent on its corresponding display portion such that the plurality of display portions are illuminable in various combinations to cause the images of illuminated display portions to be made more visibly prominently relative to remaining images in various combinations to thereby provide multiple, different graphical user interfaces.

2. The display as recited in claim 1, wherein the images comprise image fragments and the image fragments are selectively made more visibly prominent to form various complete images whereby the various complete images are presentable in substantially the same location of the graphical user interface.

3. A method for manufacturing a device having multiple, different graphical user interfaces, comprising arranging both a panel having a touch-sensitive surface and a plurality of individually illuminable translucent display portions in overlapping relation and arranging on each display portion an image wherein the image is arranged on its corresponding display portion so as to become more visibly prominent on its corresponding display portion when its corresponding display portion is provided with light energy from a source of light energy such that the plurality of display portions are illuminable in various combinations to cause the images of illuminated display portions to be made more visibly prominent relative to remaining images in various combinations to thereby provide the multiple, different graphical user interfaces.

4. The method as recited in claim 3, wherein the images comprise image fragments and the image fragments are selectively made more visibly prominent to form various complete images whereby the various complete images are in substantially the same location of the graphical user interface.

5. The method as recited in claim 4, further comprising associating a selectively activatable source of light energy with each of the plurality of translucent display portions.

6. The method as recited in claim 5, wherein arranging the images on its corresponding display portion comprises providing an image with at least one surface having an angle relative to a direction of travel of light energy from a source of light energy such that light energy from the source of light energy is reflected generally towards a user of the device.

7. The method as recited in claim 6, wherein at least one source of light energy comprises a multi-colored source of light energy.

8. The method as recited in claim 7, wherein a color is utilized to convey information concerning a state of an appliance.

9. The method as recited in claim 4, wherein at least one of the graphical user interfaces conveys information concerning a state of an appliance by means of selectively illuminated image fragments.

* * * * *